United States Patent
Waller (10) Patent No.: US 7,028,206 B2
(45) Date of Patent: Apr. 11, 2006

(54) CIRCUIT AND METHOD FOR GENERATING A LOCAL CLOCK SIGNAL SYNCHRONIZED TO AN EXTERNALLY GENERATED REFERENCE CLOCK SIGNAL

(76) Inventor: William Kenneth Waller, 2262 N. Greenview Ct., Eagle, ID (US) 83616

( * ) Notice: Subject to any disclaimer, the term of this patent is extended or adjusted under 35 U.S.C. 154(b) by 511 days.

(21) Appl. No.: 10/319,907

(22) Filed: Dec. 16, 2002

(65) Prior Publication Data

US 2004/0117683 A1 Jun. 17, 2004

(51) Int. Cl.
G06F 1/12 (2006.01)
H03L 7/06 (2006.01)

(52) U.S. Cl. ............... 713/400; 713/401; 327/149

(58) Field of Classification Search ........ 713/400, 713/401; 365/233; 327/141, 149, 151, 153, 327/155, 158, 160, 161
See application file for complete search history.

(56) References Cited

U.S. PATENT DOCUMENTS

| 5,218,314 | A | * | 6/1993 | Efendovich et al. ........ 327/152 |
| 5,969,551 | A | * | 10/1999 | Fujioka ..................... 327/149 |
| 6,229,363 | B1 | * | 5/2001 | Eto et al. .................... 327/158 |
| 6,342,796 | B1 | * | 1/2002 | Jung .......................... 327/141 |
| 6,480,047 | B1 | * | 11/2002 | Abdel-Maguid et al. .... 327/161 |
| 6,728,163 | B1 | * | 4/2004 | Gomm et al. ............... 365/233 |

FOREIGN PATENT DOCUMENTS

JP 2000347765 A * 12/2000

OTHER PUBLICATIONS

Moon et al, An All-Analog Multiphase Delay-Locked Loop Using a Replica Delay Line for Wide-Range Operation and Low-Jitter Performance, Mar. 2000, IEEE, Vo. 35, No. 3, pp. 377-384.*

* cited by examiner

Primary Examiner—Chun Cao
Assistant Examiner—Suresh K Suryawanshi (57) ABSTRACT

A delay locked loop for generating a replica clock signal synchronized to an externally generated clock signal comprises a succession of separately controlled delay lines. Each of the delay lines has different delay resolution.

13 Claims, 7 Drawing Sheets

CIRCUIT AND METHOD FOR GENERATING A LOCAL CLOCK SIGNAL SYNCHRONIZED TO AN EXTERNALLY GENERATED REFERENCE CLOCK SIGNAL

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

This invention relates to the field of semiconductor integrated circuits, particularly to circuits useful for generating local clock signals synchronized to an external reference clock, and to semiconductor memory devices with such circuits.

System specifications for double data rate dynamic random access memory(DDR DRAM) require the device in a read cycle to switch its data lines(DQ) coincident with transitions of an externally generated reference clock. The fact that the frequency of the reference clock is not known precisely presents an obstacle to meeting the above requirement. The fact that the DQ line drivers have significant delays presents another obstacle.

To meet the above requirement, a DDR DRAM device typically employs a delay locked loop(DLL) to create a delayed replica clock that exactly matches the system reference clock in both frequency and phase. The DLL creates its replica clock by making a delayed copy of the reference clock. The copy has the same frequency as the reference clock because delaying a signal does not change its frequency. The DLL adjusts the delay of the copy until the copy is delayed by one or more full clock cycles from the reference clock. At this point, the reference clock and the delayed copy of the reference clock are synchronized, and the copy is then a replica of the reference clock.

The following discussion describes the DLL as locked when its replica clock matches the frequency and phase of the reference clock, and describes the smallest available delay increment by which the DLL may be adjusted as the resolution of the DLL.

The DLL typically taps a DQ clock signal from its delay signal path at a point preceding the replica clock by one clock input buffer delay, plus a DQ line driver delay(buffer delay). The phase of the DQ clock therefore leads the phase of the replica clock by one buffer delay. When the DLL is locked, the phase of the DQ clock signal also leads the reference clock by one buffer delay. The DQ clock may be used to trigger the DQ line drivers so that the DQ lines switch coincident with the reference clock transitions, thus meeting the above requirement.

The speed with which a DLL can achieve the locked condition is an important aspect of DLL performance. At system startup, after every self-refresh, and after exiting low power modes, a DLL which locks more quickly than other designs can perform its first read sooner, improving overall performance of the device.

The stability of the DLL locking in the presence of normal electrical disturbances is another important aspect of DLL performance. A design which loses lock due to a change in supply voltage or temperature cannot function until lock is regained.

Figure 1:
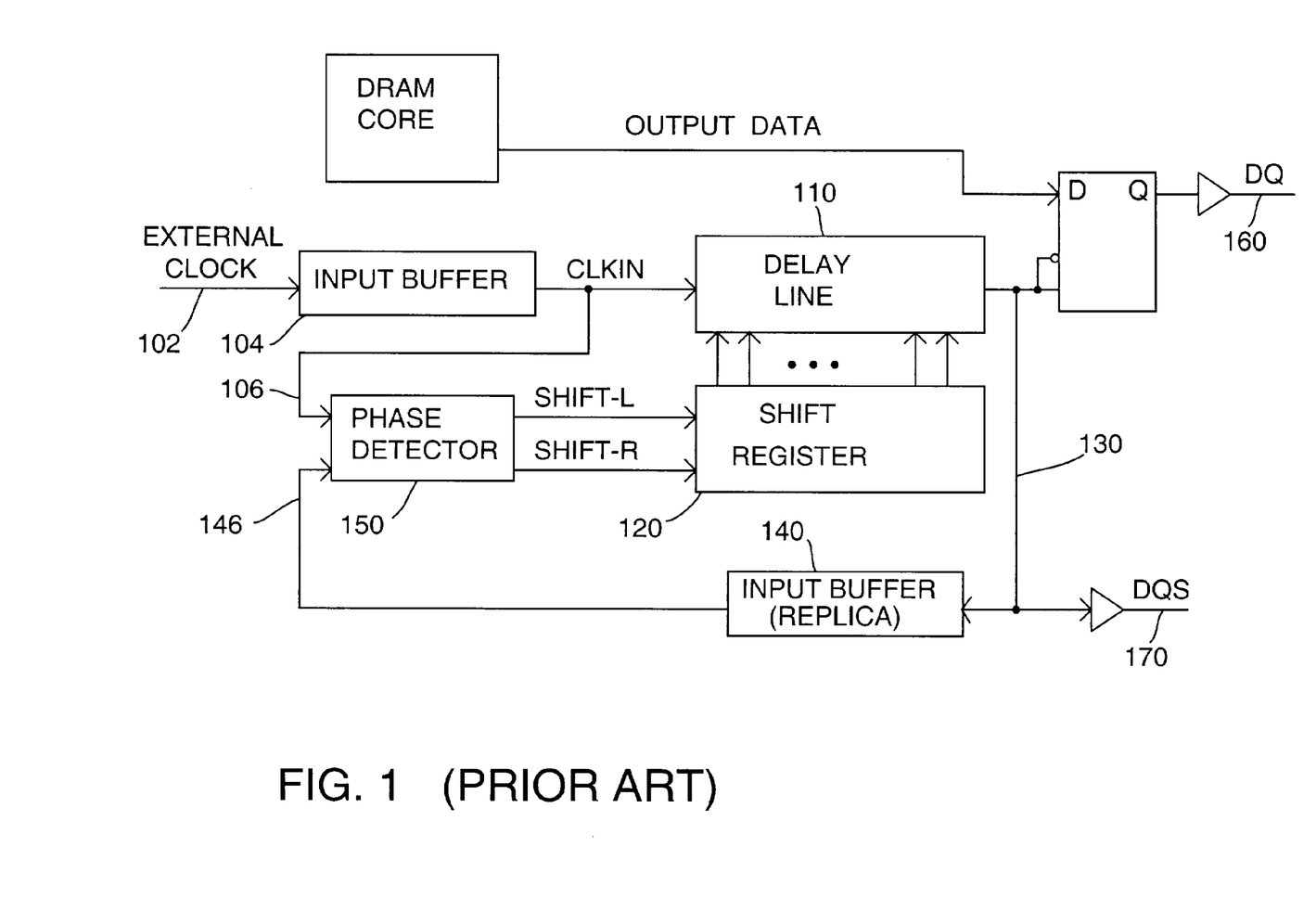
FIG. 1 shows a prior-art DLL design described in Keeth and Baker, 'DRAM Circuit Design, A Tutorial,' IEEE Press, New York, 2001, page 143.

FIG. 1 shows prior art in delay locked loops as summarized in Keeth and Baker, 'DRAM Circuit Design, A Tutorial,' IEEE Press, New York, 2001, page 143. In FIG. 1, a shift register 120 selects the number of delay increments applied by a delay line 110 to an external reference clock 102. Delayed clock 130 emerging from the delay line triggers output data 160, data strobe 170, and feeds back to phase detector 150 through delay block 140. Delay block 140 replicates the delay of input buffer 104. Phase detector 150 controls shift register 120 to remove any phase difference between its input signals 106 and 146 that are larger than the incremental delays controlled by its counter, as known by one skilled in the art.

The FIG. 1 design uses a single delay line having the same unit delay in each stage. This approach has the disadvantage of requiring many delay stages to do its job. As a typical example, if the maximum clock period is 10 nanoseconds, and the minimum clock period is 5 nanoseconds, and the delay resolution is 100 picoseconds, the FIG. 1 design requires 50 delay stages to meet the requirements with no margin. Implementing such a large number of stages requires more device size and power consumption than necessary.

The large number of stages also causes the disadvantage of slow locking. The phase detector must wait at least two clock cycles before making each decision, and each decision can only adjust total delay by a single unit delay. Thus the design of FIG. 1 moves toward locking by taking small steps, often over many steps.

The design of FIG. 1 has the further disadvantage of making delay adjustments by varying the location where the clock signal enters the delay line, so the adjustments propagate through all active delay elements before evaluation at the phase detector. Adjusting at the beginning end, rather than the trailing end, of the delay line slows evaluation of the adjustment, because the design has to wait before evaluating until each adjustment propagates to the phase detector. The design must address the worst case, and pause before evaluating for the full length of the delay line.

The FIG. 1 design has a further disadvantage of requiring flip-flops in the shift register outputs that control the delay line. Because the design needs flip-flops with near-zero setup time, the design operates the flip-flops close to the region where metastable operation can occur. For reliable flip-flop performance, the design must add either extra filtering circuitry, or extra setup delay. The use of flip-flops causes the device to suffer extra size or reduced performance.

Figure 2:
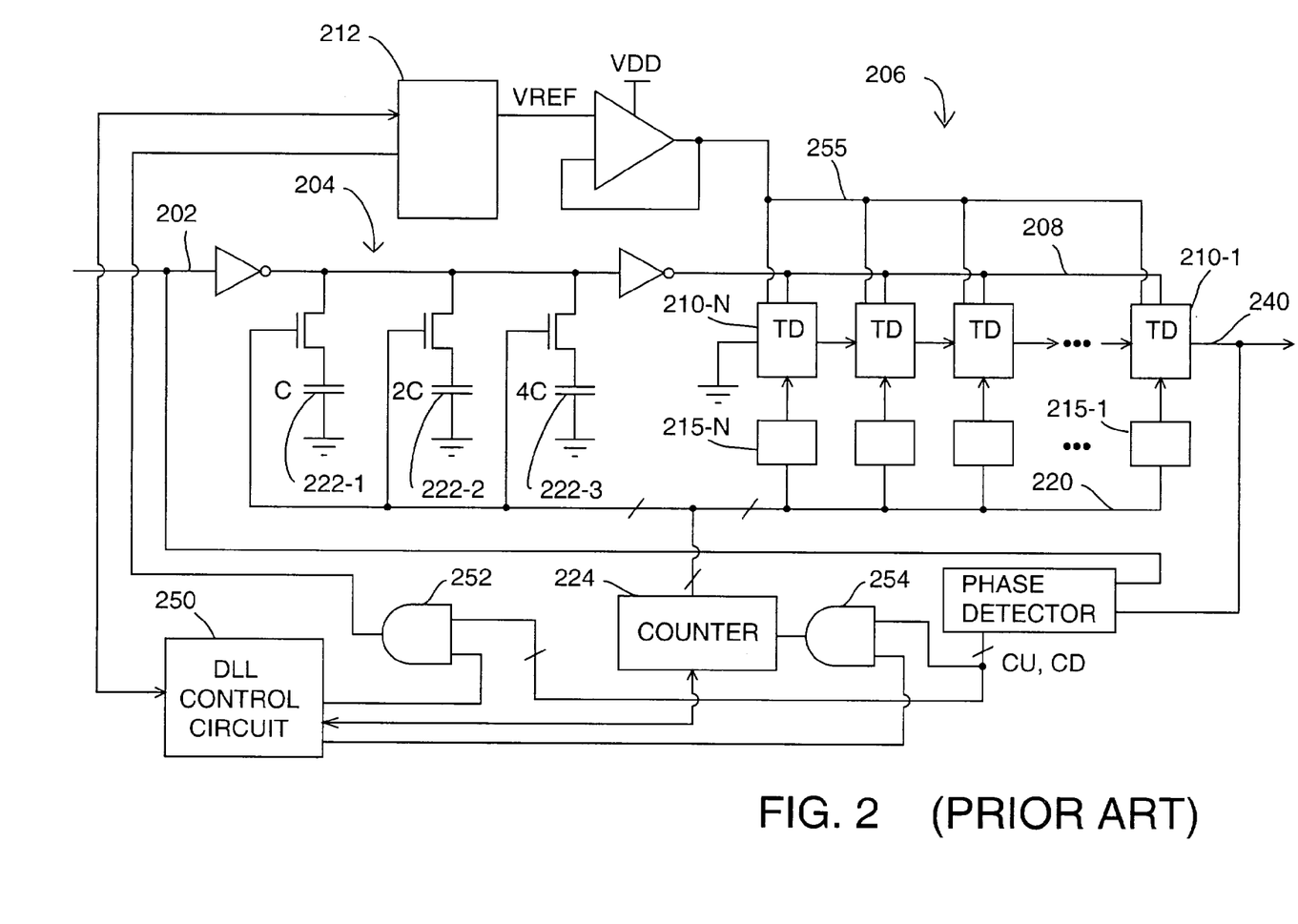
FIG. 2 shows a prior art DLL circuit taught by U.S. Pat. No. 6,438,067, issued Aug. 20, 2002 to Kuge.

FIG. 2 shows further prior art, U.S. Pat. No. 6,438,067, issued Aug. 20, 2002 to Kuge et al. This patent teaches a DLL having an adjustable delay buffer and an adjustable delay line in series. Delay elements in the delay buffer provide delay increments that are smaller than those in the delay line. Reference clock 202 enters a delay buffer 204 where the delay is controlled by selectively connecting capacitive loads 222 responsive to the low-order bits of a count in counter 224. The clock signal then enters delay line 206, where its delay is further adjusted by passing through an adjustable number of delay elements 210, set by the high-order bits of the same counter. Decoders 215-1, . . . 215-n select which one of delay elements 210-1, . . . 210-n admits buffered clock signal 208 into the delay line.

The Kuge patent further controls the delay of each delay element 210 by varying its supply voltage on node 255, so that a fairly small number of delay elements will suffice. At circuit startup, DLL control circuit 250 enables reference potential generating circuit 212 to adjust the supply voltage of the delay line, responsive to the output signal 240 until the remaining adjustment is within a predetermined range. Then the DLL control circuit uses gates 252 and 254 to disable voltage supply variation and enable delay line variation to further adjust DLL delay.

The Kuge patent has the disadvantage of using analog voltage controls for initial steps toward lock, causing speed of locking to be less than optimal. As is known to one skilled in the art, supply voltage controls must operate more slowly than digital controls, to avoid underdamped oscillations (ringing). This approach gives a wide frequency range with a small number of delay line elements, but will have a slow initial lock.

The Kuge patent has the further disadvantage of having variable size delay steps in its delay line, while the delay steps in its delay buffer are a fixed size. With both the delay buffer and delay line driven from the same counter, each counter change needs to change the total delay of both stages in a uniform fashion to be able to smoothly adjust the total delay. This is impossible since the delay of each delay line element changes with node 255 voltage, while the delay of the delay buffer step does not change. This problem will cause the DLL to have a variable locking resolution. The total delay will not change in a uniform manner as the counter is incremented and decremented.

For example, when the low-order three bits of the counter contain all ones, then all seven units of capacitance in the delay buffer are switched on. When the counter increments, the capacitances are all switched out of the circuit, and one delay-line increment is added to the total delay. The delay-line increment should equal eight of the buffer capacitance units, but the delay-line increments vary significantly due to the voltage controls. When the delay line increment is less than seven of the buffer capacitance units, and the count increments across the boundary between the buffer and the delay line to call for more delay, the line delay decreases instead of increasing. When the delay line increment is more than eight of the buffer capacitance units, and the count crosses the boundary between the delay buffer and the delay line there is a large change in total delay. A gap appears every eighth count, at this boundary, in total delay values which the delay line can provide, due to the variable-voltage controls.

Large temperature variations are common between quiescent conditions and full speed operation. Temperature variations cause changes in circuit delay, requiring the DLL to make small delay adjustments after the initial lock. The margin between external clock and the DQ as the temperature varies will be larger than other prior art, and the current invention, because the total delay of the delay buffer and delay line do not increment in a uniform manner over temperature changes.

BRIEF SUMMARY OF THE INVENTION

The current invention provides a DLL which overcomes the disadvantages of prior art circuits by providing multiple adjustable delay lines, each having separate controls and different delay resolutions. The delay lines are arranged in series so that total delay from the reference clock to the replica clock is the sum of delays imparted by each delay line. The reference clock feeds into a first delay line providing relatively coarse delay increments. Delay lines following the first delay line provide smaller delay increments, and more precise delay control. However, the first delay could have a small delay increment with the following delay lines providing a larger delay increment and still fall within the scope of the current invention.

Each delay line has separate delay controls including a counter that sets the number of incremental delays applied by the delay line to the clock signal. When the delay of a delay line is adjusted, the counter of the next, higher resolution delay line is typically set at midrange, to maximize its available range of locking.

A DLL typically waits two or more clock cycles between each adjustment, to allow the clock signal to stabilize, and to allow the adjusted clock timing to propagate through the delay line and back to the phase detector inputs. By having coarse delays, my DLL design can match its replica clock to the external clock more quickly than a DLL without coarse delay steps, because each initial adjustment may take larger steps toward lock. My design also locks more quickly than prior art which uses analog voltage controls, because my design does not vary the supply voltage, so it has no need to move slowly enough to avoid supply voltage oscillation.

The coarse delays also permit the DLL to operate over the required frequency range using far fewer delay elements than designs having a only single delay line, giving the advantages of smaller layout and lower power consumption compared to prior art.

Since the coarse delay line length is only changed during the initial lock, my DLL has a uniform delay line step for temperature transients. The uniform delay line steps enable the phase detector to keep the maximum difference between reference clock transitions and DQ transitions(margin) within the resolution of the smallest delay line element.

In the current invention, each counter is typically a conventional up/down counter which increments and decrements its count responsive to pulses on UP and DN input nodes, respectively. An alternate implementation may use a counter with a single COUNT input node, in which the counter keeps track of the direction of counting, and reverses its direction at end-of-range.

A separate phase detector for each delay line typically controls the counter of the delay line. The phase detector compares the reference clock with the replica clock, with resolution roughly equal to the delay elements of its delay line. Based on the phase comparison, the phase detector directs the counter to increment its count when more delay is needed, to decrement its count when less delay is needed, and to make no change when the phase difference is less than the resolution of the delay line. In the preferred embodiment, a wrap control replaces the phase detector in one of the delay lines as described more fully below.

Therefore, objects and advantages of the current invention include:
 (a) Separate delay lines for coarse and fine resolution, each having separate controls,
 (b) Large range of available delay with a smaller number of delay line elements via coarse adjustments,
 (c) Rapid locking via coarse adjustment capability,
 (d) Small locking resolution via fine adjustment capability,
 (e) Minimized layout size and power consumption,
 (f) Small resolution, uniform delay step sizes over all operating conditions, (g) All-digital controls for rapid convergence and stable, robust operation over full range of temperature and manufacturing process conditions, (h) Adjusting delays at the trailing end of the delay line, obtaining the shortest signal path for each adjustment to propagate to the phase detector, and the fastest possible evaluation of each adjustment, and a constant amount time after each adjustment until the adjustment may be evaluated at the phase detector, (i) No flip flops, therefore no problem of flip flop metastability, and (j) No variable voltage supply, therefore no problem of underdamped oscillation.

DETAILED DESCRIPTION OF THE INVENTION

Figure 3:
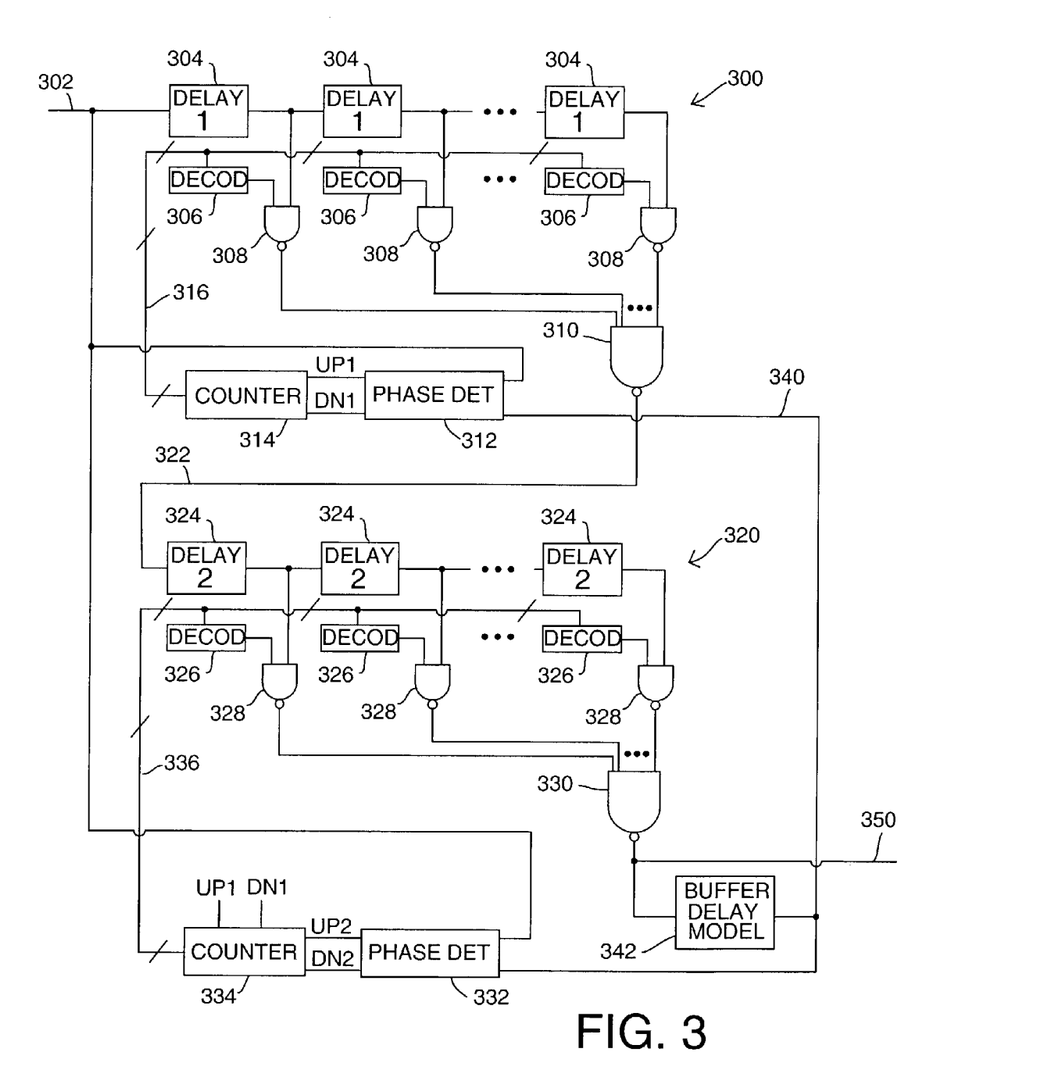
FIG. 3 shows a DLL according to the current invention, having two delay lines.

In FIG. 3, a buffered reference clock 302 is the input signal. For brevity, FIG. 3 does not show the reference clock input buffer. Buffered reference clock 302 connects to a first delay element in first delay line 300, to a first input of phase detector 312 in delay line 300, and to a first input of phase detector 332 in delay line 320. DQ clock 350 is the output signal from the DLL. DQ clock is driven by delay line 320, and connects further to buffer delay model 342. A replica clock signal 340, driven by the buffer delay model, is the feedback control signal for the loop. The replica clock connects to a second input of phase detector 312, and to a second input of phase detector 332.

In FIG. 3 delay line 300, the clock signal passes through delay elements 304 in series. Each delay element has an input node for receiving a clock signal, and an output node for conveying a copy of the clock signal delayed by a first delay time. The input node of each delay element in the delay line, except the first element, connects to the output of the preceding element in the delay line. The input node of the first element in the delay line connects to reference clock 302. The output node of each delay element in the delay line, except the last, connects as described to the input node of the succeeding element. The output node of each delay element in the delay line connects further to a first input node of a separate tap gate 308 for each delay element.

In FIG. 3, a conventional phase detector 312, and counter 314 control the total delay of the clock signal by delay line 300 as follows. Phase detector 312 compares replica clock 340 to reference clock 302. When the phase of replica clock 340 leads the phase of reference clock 302 by more than a delay of a delay element 304, phase detector 312 issues a pulse on its UP1 output, incrementing counter 314, effectively increasing the delay of delay line 300 by the delay of one delay element 304. When the phase of replica clock 340 follows the phase of reference clock 302 by more than a delay of a delay element 304, phase detector 312 issues a pulse on its DN1 output, decrementing counter 314 to effectively decrease the delay of delay line 300 by the delay of one delay element 304. Nodes UP1 and DN1 couple to counter 314 and further to counter 334. A pulse on either UP1 or DN1 sets the count of counter 334 to its midrange value. When neither action is needed, phase detector 312 issues neither signal and coarse delay line 300 is locked. After pulsing UP1 or DN1, phase detector 312 waits long enough for the adjustment to propagate through the DLL and back to the phase detector inputs before repeating its compare/adjust operation.

Counter 314 in FIG. 3 comprises UP1 and DN1 input nodes, driven as described by phase detector 312. Counter 314 typically increments or decrements its count from a predetermined nominal delay value at system startup, but it may also begin from a random count at that time.

Multi-wire bus 316 routes all bits of the count of counter 314 in parallel to a separate decoder 306 for each delay element in the first delay line. Each decoder has an output connected to a second input of tap gate 308 following its delay element. The second input of each tap gate enables and disables the tap gate for transmitting the delayed clock signal of its first input. Decoders 306 each enable a tap gate 308 only when bus 316 conveys a count that matches its position in the delay line. One of the decoders 306 enables its tap gate for each count held by counter 314.

In FIG. 3, the output signal from each tap gate 308 in the first delay line drives a separate input of first delay line output gate 310. Decoders 306 and tap gates 308 disable all but one of the signals driving gate 310. The enabled tap gate 308 drives its clock signal onto an input of gate 310. Gate 310 then drives a clock signal on node 322 having a delay substantially equal to the output of the delay element driving the enabled tap gate.

First delay line output clock signal 322 in FIG. 3 enters second delay line 320, where it passes through delay elements 324 in series. Each delay element 324 has an input node for receiving a clock signal, and an output node for conveying a delayed replica of the clock signal. The input node of each delay element in the delay line, except the first element, connects to the output of the preceding element in the delay line. The input node of the first element in the delay line connects to node 322. The output node of each delay element in the delay line, except the last, connects as described to the input node of the succeeding delay element. The output node of each delay element in the delay line connects further to a first input node of a separate tap gate 328 for each delay element. Each of the delay elements in the second delay line causes further delay by a substantially equal second delay amount, which is less than the first delay of each delay element of the first delay line.

Every clock cycle, phase detector 332 compares replica clock 340 to reference clock 302. When the phase of replica clock 340 leads the phase of reference clock 302 by more than a delay of a delay element 324, phase detector 332 issues a pulse on its UP2 output, incrementing counter 334, effectively increasing the delay of delay line 320 by the delay of one delay element 324. When the phase of replica clock 340 follows the phase of reference clock 302 by more than a delay of a delay element 324, phase detector 332 issues a pulse on its DN2 output, decrementing counter 334 to effectively decrease the delay of delay line 320 by the delay of one delay element 324. When the phase of replica clock 340 is closer to reference clock 302 than the margin of phase detector 332, phase detector 332 issues neither signal, and the loop is locked. Nodes UP1 and DN1 also couple to counter 334. A pulse on either UP1 or DN1 initializes the count of counter 334 to its midrange value whenever delay line 300 is adjusted. Pulses on UP2 and DN2 then adjust the count of counter 334 to minimize the phase difference between replica clock 340 and reference clock 302 as described. The initializing of counter 334 to a mid-point value is desirable but not necessary. After pulsing UP2 or DN2, phase detector 332 waits long enough for the adjustment to propagate through the DLL and back to the phase detector inputs before repeating its compare/adjust operation.

All bits of the count of counter 334 are passed via multi-wire bus 336 to a separate decoder 326 for each delay element of the second delay line. Each decoder 326 has an output coupled to a second input of tap gate 328 for its delay element. The count on bus 336 causes one decoder 326 corresponding to the value of the count to activate its tap gate 328. The output node of each tap gate 328 connects to a separate input of second delay line output gate 330. The activated tap gate provides a path for the clock signal to exit the second delay line and drive one input of second delay line output gate 330 with a clock signal having the particular delay of the enabled tap gate of delay line 320. Gate 330 then drives the DQ clock output signal on node 350 with substantially this same delay. The logic function of gates 308 and 310, or gates 328 and 330, could be implemented in many different ways without affecting the scope of this invention.

Figure 4:
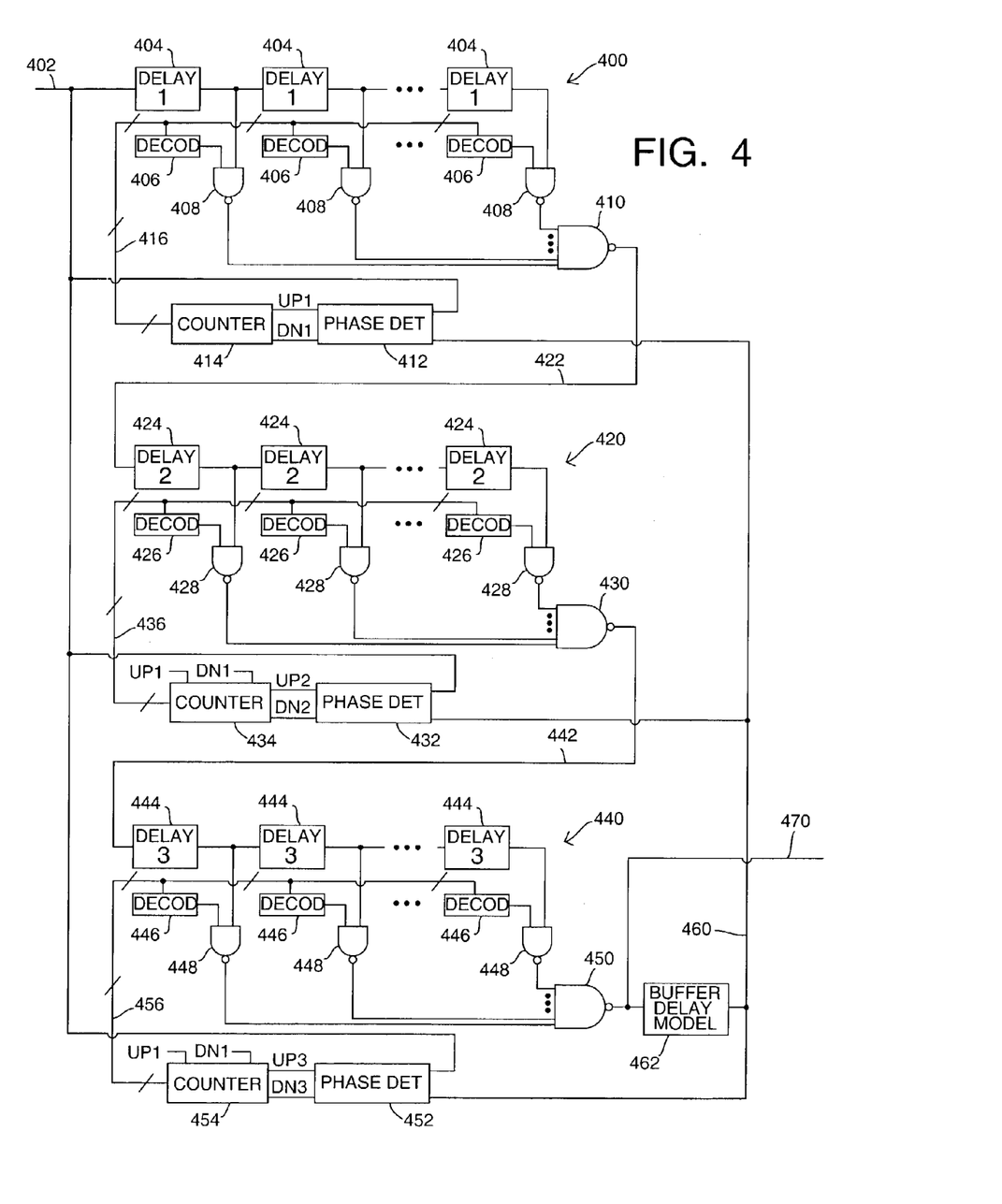
FIG. 4 shows a DLL according to the current invention, having three delay lines.

FIG. 4 shows a second implementation of the current invention, in which the delay locked loop comprises three delay lines 400, 420 and 440 connected in series. Buffered reference clock 402 is the input signal. The reference clock connects to the input node of first delay element 404 of delay line 400, and to a first input of conventional phase detectors 412, 432, and 452. Output gate 450 of third delay line 440 drives the DQ clock output on node 470. Node 470 further couples to the input node of buffer delay model 462, which drives replica clock 460. The replica clock connects as a second input to each of three phase detectors 412, 432, and 452.

In FIG. 4, the reference clock enters delay line 400 and traverses delay elements 404 in succession, being delayed by a first delay value in traversing each element. The first delay value represents a relatively coarse fraction of the period of the input reference clock signal. Each delay element has an input node for receiving a clock signal, and an output node for conveying a delayed copy of the clock signal. The input node of each delay element in the delay line, except the first element, connects to the output of the preceding element in the delay line. The input node of the first element in the delay line connects to reference clock 402. The output node of each delay element in the delay line, except the last, connects as described to the input node of the succeeding element. The output node of each delay element in the delay line connects further to a first input node of a separate tap gate 408 for each delay element.

In FIG. 4, a conventional phase detector 412, and counter 414 control the delay of the clock signal by the first delay line as follows. Every clock cycle, phase detector 412 compares replica clock 460 to reference clock 402. When the phase of replica clock 460 leads the phase of reference clock 402 by more than the delay of a delay element 404, phase detector 412 issues a pulse on its UP1 output to increment counter 414, thereby increasing the delay of delay line 400 by the delay of one delay element 404. When the phase of replica clock 460 follows the phase of reference clock 402 by more that the delay of a delay element 404, phase detector 412 issues a pulse on its DN1 output to cause counter 414 to count down, decreasing the delay of delay line 400 by the delay of one delay element 404. Nodes UP1 and DN1 couple phase detector 412 to counter 414, and further couple to counter 434 and counter 454. A pulse on either UP1 or DN1 sets counters 434 and 454 to their midrange count values. The initialization of counters 434 and 454 to a mid-point value is desirable but not necessary. After pulsing UP1 or DN1, phase detector 412 waits long enough for the adjustment to propagate through the delay lines and back to the phase detector inputs before repeating its compare/adjust operation. When the phase of replica clock 460 is closer to the reference clock 402 than the phase detector margin, phase detector 412 issues neither signal and the first delay line is locked. If the reference clock has constant frequency, no further change is needed in the first delay line.

Counters 414, 434, and 454 in FIG. 4 are conventional up/down counters, with UP1 and DN1 input nodes driven as described by phase detector 412.

Each bit of the count in counter 414 couples to a separate wire of counter bus 416. Bus 416 routes all bits of the count of counter 414 in parallel to a separate decoder 406 for the output of each delay element in the first delay line. Each decoder has an output connected to a second input of tap gate 408 for its delay element. The second input of each tap gate enables and disables the tap gate for transmitting the clock signal on its first input. A decoder 406 enables a tap gate 408 only when bus 416 conveys a count that matches its position in the delay line. One decoder 406 enables its tap gate 408 for each count held by the counter.

In FIG. 4, an output signal from each tap gate 408 in the first delay line connects to a separate input of first output gate 410. Decoders 406 and tap gates 408 disable all but one of the signals driving gate 410. The single enabled tap gate drives its delayed clock signal onto an input of gate 410. Gate 410 then drives a clock signal on node 422 having a delay substantially equal to the output of delay element 404 driving the enabled tap gate.

First delayed clock 422 connects as an input to a second delay line 420 in FIG. 4. Second delay line 420 operates in similar fashion to first delay line 400. However, the second delay of each delay element in the second delay line is substantially less than the first delay of each delay element in the first delay line. Thus the second delay line provides a delay with finer resolution than that given by the first delay line. When the first delay line is adjusted, counter 434 of the second delay line is initialized at its mid-range value by a pulse on either the UP1 or the DN1 node.

Delay lines 400, 420, and 440 are arranged in series so that the total delay from reference clock 402 to replica clock 460 is the sum of the delays from the individual delay lines, plus the delay from buffer delay model 462. The loop is locked when all three delay lines are locked and no further changes are needed to match the phase of the replica clock with that of the reference clock.

In FIG. 4, first delay line output 422 enters delay line 420 and traverses delay elements 424 in succession, being delayed by a second delay value in traversing each element. The second delay value represents a smaller fraction of the reference clock cycle time than does the first delay value. Each delay element 424 has an input node for receiving a clock signal, and an output node for conveying a delayed copy of the clock signal. The input node of each delay element in delay line 420, except the first element, connects to the output of the preceding element in the delay line. The input node of the first element in the delay line connects to first delayed clock 422. The output node of each delay element in the delay line, except the last, connects as described to the input node of the succeeding delay element. The output node of each delay element in the delay line connects further to a first input node of a separate tap gate 428 for that delay element.

In FIG. 4, a conventional phase detector 432, and counter 434 control the total delay of the clock signal by the second delay line as follows. Every clock cycle, phase detector 432 compares replica clock 460 to reference clock 402. When the phase of replica clock 460 leads the phase of reference clock 402 by more than a delay of delay element 424, phase detector 432 issues a pulse on its UP2 output to cause counter 434 to increment its count, increasing the delay of delay line 420 by the delay of one delay element 424. When the phase of replica clock 460 follows the phase of reference clock 402 by more than a delay of delay element 424, phase detector 432 issues a pulse on its DN2 output to cause counter 434 to decrement counter 434, decreasing the delay of delay line 420 by the delay of one delay element 424. After pulsing UP2 or DN2, phase detector 432 waits long enough for the adjustment to propagate through the delay lines and back to the phase detector inputs before repeating its compare/adjust operation. When the phase of replica clock 460 is closer to reference clock 402 than the phase detector margin, phase detector 432 issues neither signal and delay line 420 is locked. If the reference clock has constant frequency, no further change is needed in delay line 420. Whenever an adjustment of the delay line occurs, all phase detectors should be disabled, or the clocking of all counters inhibited, until the adjustment has propagated to the replica clock node.

Counter 434 in FIG. 4 is a conventional up/down binary counter having UP2 and DN2 input nodes, UP1 and DN1 input nodes, and an output count bus 436. Each bit of the count in counter 434 couples to a separate wire of count bus 436.

Bus 436 routes all bits of the count of counter 434 in parallel to a separate decoder 426 for each delay element in the second delay line. Each decoder 426 has an output connected to a second input of the tap gate 428 for its delay stage. The second input of each tap gate enables and disables the tap gate for transmitting the delayed clock signal on its first input. Each decoder 426 enables its tap gate 428 only when bus 436 conveys a count that matches its position in the second delay line. One decoder 426 enables its tap gate for each count held by the counter. The one enabled tap gate routes the delayed clock signal out of the delay line with a cumulative delay corresponding to its location in the delay line.

In FIG. 4, an output node from each tap gate 428 in the second delay line connects to a separate input of second delay line output gate 430. The single enabled tap gate drives its clock signal onto an input of gate 430. Gate 430 then drives a delayed clock signal on node 442, having delay substantially equal to the output of delay element 424 driving the enabled tap gate.

Second delayed clock 442 connects as an input to third delay line 440 in FIG. 4. The amount of delay from each delay element in the third delay line is substantially less than the delay of each delay element in the first and second delay lines. Phase detector 452 has a resolution approximately the same as the delays in the third delay line. Thus the third delay line provides delay control with finer resolution than that given by the first and second delay lines alone.

In FIG. 4, second delayed clock 442 enters third delay line 440 and passes through delay elements 444 in succession, being delayed by a substantially equal delay time in traversing each element. Each delay element 444 has an input node for receiving a clock signal, and an output node for conveying a delayed copy of the clock signal. The input node of each delay element in delay line 440, except the first element, connects to the output of the preceding element in the delay line. The input node of the first element in the delay line connects to second delayed clock 442. The output node of each delay element in the delay line, except the last, connects as described to the input node of the succeeding element. The output node of each delay element in the delay line connects further to a first input node of a separate tap gate 448 for each delay element.

In FIG. 4, a conventional phase detector 452, and counter 454 control the total delay of the clock signal by the third delay line as follows. Counter 454 is initialized to its midrange count by a pulse on UP1 or DN1 whenever coarse delay line 400 is adjusted. Another embodiment of the invention will initialize counter 454 to its midrange count whenever a pulse on UP2 or DN2 occurs. Every clock cycle, phase detector 452 compares replica clock 460 to reference clock 402. When the phase of replica clock 460 leads the phase of reference clock 402 by more than the delay of a delay element 444, phase detector 452 issues a pulse on its UP3 output to increment counter 454, to increase the delay of delay line 440 by the delay of one delay element 444. When the phase of replica clock 460 follows the phase of reference clock 402 by more than the delay of a delay element 444, phase detector 452 issues a pulse on its DN3 output to decrement counter 454, decreasing the delay of delay line 440 by the delay of one delay element 444. After pulsing UP3 or DN3, phase detector 452 waits long enough for the adjustment to propagate through the delay lines and back to the phase detector inputs before repeating its compare/adjust operation. When the phase of replica clock 460 is closer to reference clock 402 than the phase detector margin, the phase detector issues neither signal and the loop is locked.

Each bit of the count in counter 454 couples to a separate wire of count bus 456. Bus 456 routes all bits of the count of counter 454 in parallel to a separate decoder 446 for each delay element in the second delay line. Each decoder 446 has an output connected to a second input of tap gate 448 for the delay stage of the decoder. The second input of each tap gate 448 enables and disables the tap gate for transmitting the delayed clock signal on its first input. Each decoder 446 enables its tap gate only when bus 456 conveys a count that matches its position in delay line 440. One decoder 446 enables its tap gate for each count held by the counter. The enabled tap gate routes the delayed clock signal out of delay line 440 at a location in the delay line where the clock signal has passed through a number of delay elements 444 equal to the count in counter 454.

In FIG. 4, an output node of each tap gate 448 in the third delay line connects to a separate input of third delay line output gate 450. The single enabled tap gate drives its clock signal onto an input of gate 450. Gate 450 then drives the DQ clock output signal on node 470, the DQ clock output having a total delay substantially equal to the output of delay element 444 driving the enabled tap gate.

Node 470 further drives the input node of buffer delay model 462. Buffer delay model 462 then drives the replica clock on node 460.

Figure 5:
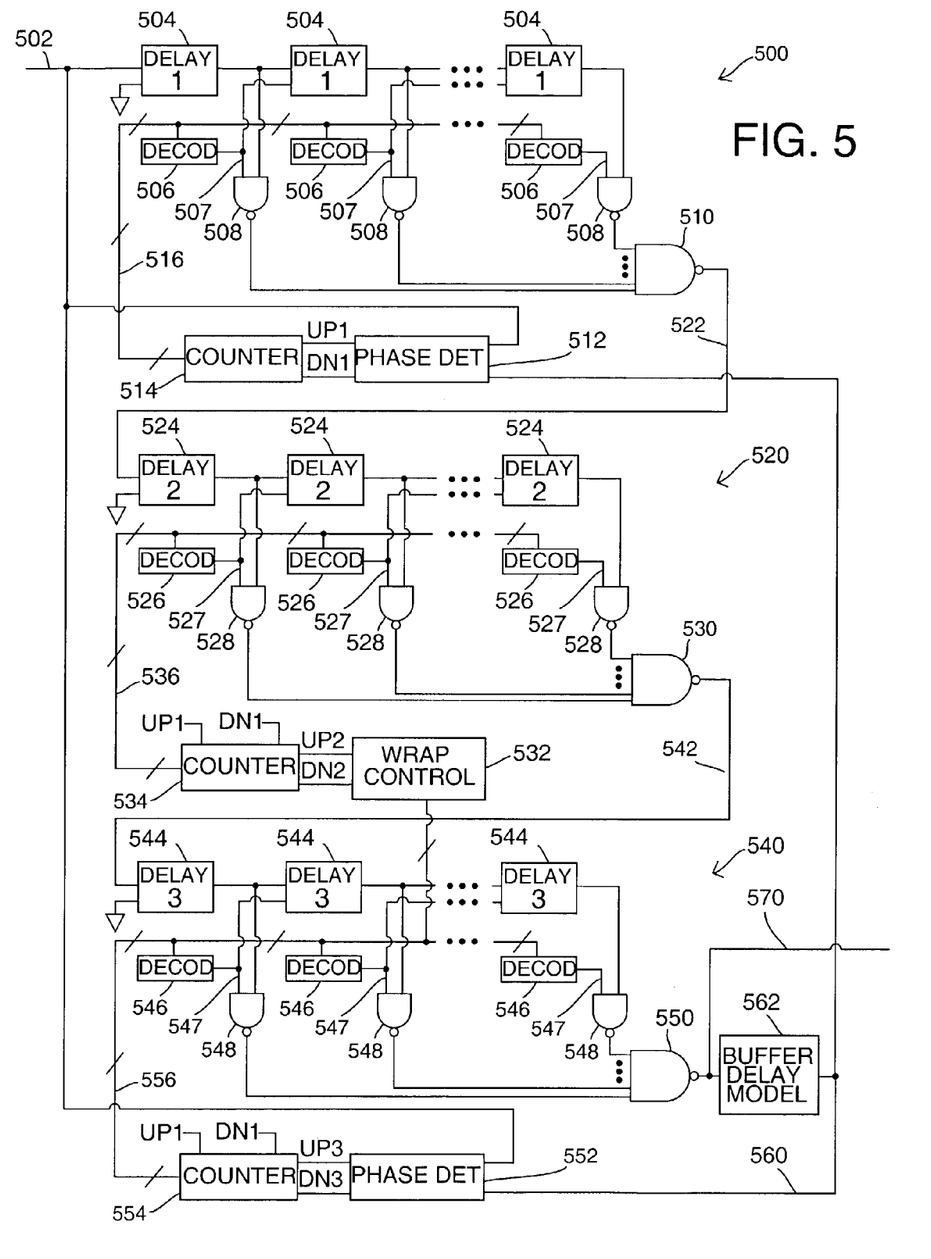
FIG. 5 shows the preferred embodiment of the current invention.

FIG. 5 shows the preferred implementation of the current invention. A buffered reference clock on node 502 is the input signal. A DQ clock on node 570 is the output signal. Three delay lines, 500, 520, and 540 coupled in series provide a path for conveying a delayed copy of the reference clock from node 502 to node 570. A replica clock driven on node 560 by output buffer delay model 562 is the feedback signal. Reference clock 502 connects to an input node of the first delay element of delay line 500, and also to a first input node of conventional phase detectors 512 and 552. Replica clock 560 connects to a second input node of phase detectors 512 and 552.

Figure 6:
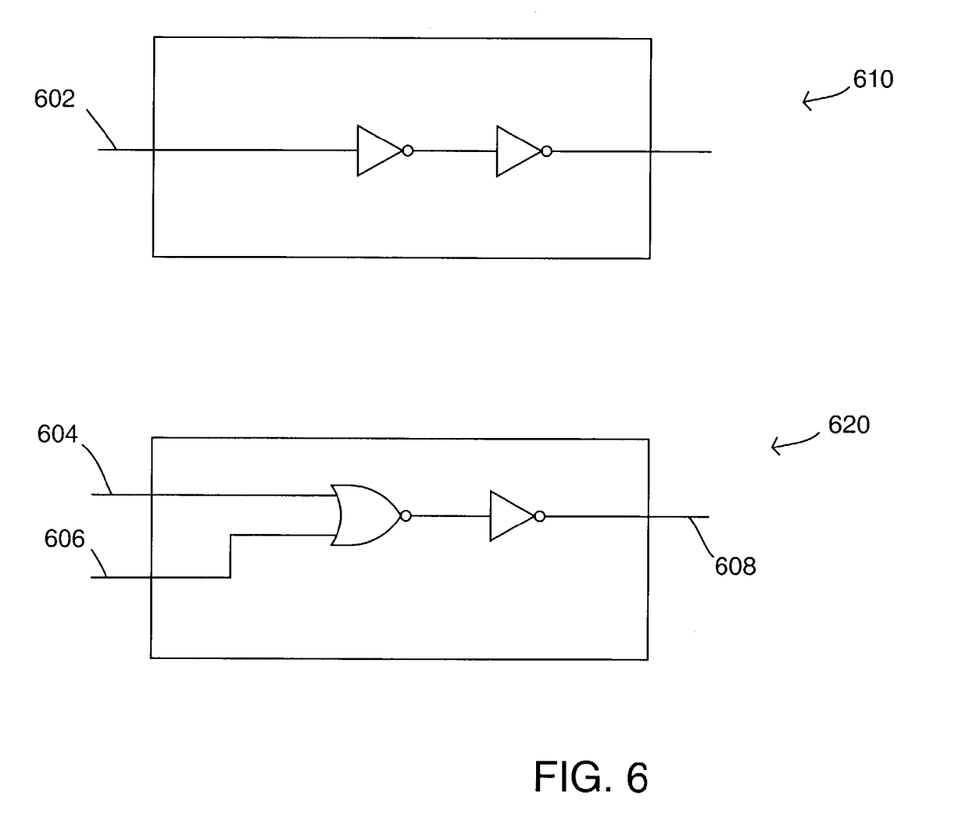
FIG. 6 details the logic of the one-input delay block shown in FIG. 3 and FIG. 4, and the two-input delay block shown in FIG. 5.

Delay lines 500, 520, and 540 of FIG. 5 use delay elements having two inputs. The logic design of two-input delay element 544 is shown in more detail by FIG. 6, delay element 620. Delay element 610 corresponds to delay elements 324 or 444. Delay elements 504 and 524 will use the NOR function shown in delay element 620 on their input structure of the delay circuit being used. These delay elements have a longer delay than delay element 544 of FIG. 5, and to one skilled in logic design can be implemented in many different ways.

In FIG. 5, second delay line 520 uses a wrap control circuit 532 instead of a phase detector for controlling its counter. The wrap control steers counter 534 in the intermediate delay line via pulses on UP2 and DN2 lines between the wrap control and its counter, responsive to the digital count in the counter controlling the last, highest resolution delay line in the loop. The wrap control makes its decision to count up, count down, or do nothing so as to prevent counter 554 of the smallest resolution delay line from wrapping around after its count reaches either end of its range. When counter 554 reaches the minimum end of its range, the wrap control decrements medium range counter 534 by pulsing its DN2 output, to provide less delay from the intermediate delay line 520 and increments counter 554 to increase the delay of delay line 540 by a delay of delay element 524. This moves counter 554 away from the minimum value with no delay change in signal 560. When counter 554 reaches the maximum end of its range, the wrap control increments counter 534 by pulsing its UP2 output, to increase the delay from the second delay line 520, and decrements counter 554 to decrease the delay of delay line 540 by a delay of delay element 524. Counter 554 thus moves away from its maximum value with no delay change in signal 560. After adjusting counter 534 and counter 554, wrap control 532 and phase detector 552 wait long enough for the adjustment to propagate through the delay lines and back to phase detector 552 before repeating its compare/adjust operation. When counter 554 is not at the end of its numerical range, the wrap control makes no change to counter 534.

In delay line 500, the delays of every element 504 are a relatively coarse, substantially equal fraction of the reference clock cycle time. Each delay element 504 has a first input node for receiving a clock signal, a second input node for receiving an active-low enable signal, and an output node for conveying a delayed copy of the clock signal.

The first input node of each delay element in delay line 500, except the first element, connects to the output of the preceding element in the delay line. The first input node of the first delay element in delay line 500 connects to reference clock node 502. The second input node of each delay line 500, except the first element, connects to the output of decoder 506 of the preceding delay stage. The second input node of the first delay element of delay line 500 is tied logically low. The output node of each delay element in the delay line, except the last, connects as described to the input node of the succeeding delay element in delay line 500. The output node of each delay element in delay line 500 connects further to a first input node of a separate tap gate 508 for each delay element.

A conventional phase detector 512, and counter 514 control the total delay of the first delay line as follows. Phase detector 512 directly compares reference clock 502 with delayed replica clock 560. When the phase of replica clock 560 leads the phase of reference clock 502 by more than the delay of a delay element 504, phase detector 512 increments counter 514 by sending a pulse on its UP1 output node to counter 514. When the phase of replica clock 560 follows the phase of reference clock 502 by more than the delay of a delay element 504, phase detector 512 decrements counter 514 by sending a pulse on its DN1 output to counter 514. A pulse on either UP1 or DN1 also sets the counts of counters 534 and 554 to their midrange values. After pulsing UP1 or DN1, phase detector 512 waits long enough for the adjustment to propagate through the delay lines and back to the phase detector inputs before repeating its compare/adjust operation. When the delay of the first delay line is correct within the delay of a delay element 504, phase detector 512 pulses neither UP1 nor DN1, and the first delay line is locked.

Counter 514 may start from a preset count at system startup, or from a random count at startup. Counter 514 may also be initialized to a preset count whenever the DLL is re-enabled. In response to the directional commands from phase detector 512, counter 514 accumulates a digital count enumerating the number of delays 504 to be applied by delay line 500 to the reference clock. Each bit of counter 514 couples to a separate wire in count bus 516. Bus 516 routes all bits of the count in counter 514 in parallel to each decoder 506 of first delay line 500. Each decoder 506 has an output node 507 coupled to a second input of tap gate 508 for the delay element associated with the decoder. Decoder output node 507 further couples to the second input of the delay element of the next succeeding delay stage in delay line 500. Each decoder 506 disables the following delay element 504 when bus 516 conveys a count equal to its sequential position in the delay line, and enables the following delay element 504 otherwise. Disabling the following delay element at the tap point disables the clock signal from propagating down the remainder of the delay line, effectively powering down all delay elements following the delay line tap point and saving power.

In FIG. 5, the output node of each tap gate 508 in the first delay line connects to a separate input of first delay line output gate 510. Decoders 506 and tap gates 508 disable all but one of the signals driving gate 510. The single enabled tap gate drives its clock signal onto an input of gate 510, with a delay substantially equal to the output of the delay element 504 driving the enabled tap gate. Gate 510 then drives this clock signal on node 522.

In FIG. 5, first delayed clock 522 enters second delay line 520 and passes through successive delay elements 524, each of which imparts a fixed, substantially equal, second delay to the clock signal. The second delay represents a smaller fraction of the reference clock cycle time than does the first delay value. Each delay element 524 has a first input node for receiving a clock signal, a second input node for receiving an active-low enable signal, and an output node for conveying a delayed copy of the clock signal.

The first input node of each delay element, except the first, in delay line 520 connects to the output of the preceding element in the delay line. The first input node of the first element in delay line 520 connects to first delayed clock 522. The second input node of each delay element in delay line 520, except the first element, couples to the output node of the decoder of the preceding delay stage in the delay line. The second input node of the first delay element in delay line 520 is coupled logically low. The output node of each delay element in the delay line, except the last, connects as described to the input node of the succeeding element. The output node of each delay element in the delay line connects further to a first input node of a separate tap gate 528 for each delay element.

In delay line 520 of FIG. 5, counter 534 has input nodes UP2 and DN2, driven as described by wrap control 532. Counter 534 also has input nodes UP1 and DN1, driven as described by phase detector 512. Each bit of counter 534 couples to a separate wire of count bus 536. Bus 536 conveys each bit of the count from counter 534 in parallel to a separate decoder 526 for each delay element of second delay line 520. Each decoder 526 has an output node coupled to a second input node of tap gate 528 for its delay element. The second input node of each tap gate enables and disables the tap gate for transmitting the delayed clock signal on its first input node. Each decoder 526 enables its tap gate only when the count on bus 536 equals the sequential position of the decoder and its delay element in delay line 520. Decoder output node 527 further couples to the second input of the delay element of the next succeeding delay stage in delay line 520. Each decoder 526 disables the following delay element 524 when bus 536 conveys a count equal to the sequential position of the decoder in the delay line, and enables its delay element 524 otherwise. Disabling the following delay element prevents the clock signal from propagating down the remainder of the delay line following the tap point, saving power. For every count held by the counter, a single tap gate 528 is enabled. The output node of each tap gate 528 drives a separate input of output gate 530 of the second delay line. Decoders 526 and tap gates 528 disable all but one of the signals driving gate 530. The single enabled tap gate drives its clock signal onto an input of gate 530, with a delay substantially equal to the output of delay element 524 driving the enabled tap gate. The output of gate 530 then drives a clock signal having the particular delay of the enabled tap gate 528 onto node 542.

Delayed clock 542 enters third delay line 540 where it passes through successive delay elements 544. Each delay element 544 delays the clock signal by a substantially equal amount, which is less than the delays of delay elements 524. Delay lines 500, 520, and 540 can be sequentially placed in any order without affecting the functionality of the present invention.

Each delay element 544 has a first input node for receiving a clock signal, a second input node for receiving an active-low enable signal, and an output node for conveying a delayed copy of the clock signal. The first input node of each delay element in delay line 540, except the first element, connects to the output of the preceding element in the delay line. The first input node of the first element in the delay line connects to second delayed clock 542. The second input node of each delay element in delay line 540, except the first element, connects to the output of decoder 546 of the preceding delay stage in the delay line. The second input node of the first delay element in delay line 540 connects logically low. The output node of each delay element in the delay line, except the last, connects as described to the input node of the succeeding element. The output node of each delay element in the delay line connects further to a first input node of a separate tap gate 548 for that delay element.

Delay line 540 of FIG. 5 is controlled by a conventional phase detector 552, and counter 554. Phase detector 552 compares input reference clock 502 to delayed replica clock 560, and sends commands to counter 554 by pulsing the UP3 and DN3 lines connecting these two blocks. When the phase of replica clock 560 leads the phase of reference clock 502 by more than a delay of delay element 544, phase detector 552 pulses the UP3 line to increment counter 554, increasing the delay provided by the third delay line by the delay of one delay element 544. When the phase of replica clock 560 trails the phase of reference clock 502 by more than a delay of delay element 544, phase detector 552 pulses the DN3 line to decrement counter 554, decreasing the delay of the third delay line by effectively removing the delay of one delay element 544. After pulsing UP3 or DN3 to adjust counter 554, phase detector 552 waits long enough for the adjustment to propagate through the delay lines and back to the inputs of phase detector 552 before repeating its compare/adjust operation. When no change is needed, phase detector 552 sends no pulses and the loop is locked.

Counter 554 in FIG. 5 starts, after an adjustment of delay line 500, with a preset count in the middle of its numerical range, driven as described by phase detector 512 via nodes UP1 and DN1. Counter 554 accumulates a count as directed by the pulses on its UP3 and DN3 input lines. Should this count reach either end of its numerical range, wrap control 532 adjusts counter 554 away from the end of its numerical range and moves counter 534 one step in the opposite direction with the sum of the delays of delay lines 520 and 540 remaining the same. Each bit of the count in counter 554 couples to a separate wire of count bus 556. Bus 556 routes each bit of the count in parallel to each decoder 546 in the third delay line, and to wrap control 532 of the second delay line. Each decoder 546 has a single output which drives a second input of a separate tap gate 548 coupled to the decoder and to the output of its associated delay element. Each decoder 546 enables its tap gate 548 only when the count on bus 556 is equal to its sequential position in the third delay line. Each value of the count in counter 554 activates one tap gate 548, to route the clock signal out from delay line 540 after the clock signal has passed through the number of delay elements 544 indicated by the count in counter 554.

Each output from tap gates 548 drives a separate input of output gate 550 of delay line 540. Since only one of the tap gates 548 is active, the clock signal passing through the active tap gate 548 drives output gate 550 with the particularly delayed copy of the reference clock signal at the active tap gate 548. The output of gate 550 drives this delayed clock signal onto node 570, the DQ output clock.

Node 570 further connects to the input of output buffer delay model 562, which delays the clock signal by an amount equal to the input and DQ buffer delay. Buffer delay model 562 then drives the replica clock on node 560. The DQ clock output thus precedes the replica clock by one buffer delay. When the loop is locked and the delayed replica clock on node 560 has the same phase as input reference clock 502, then the DQ outputs transition coincident with the clock, as required.

Figure 7:
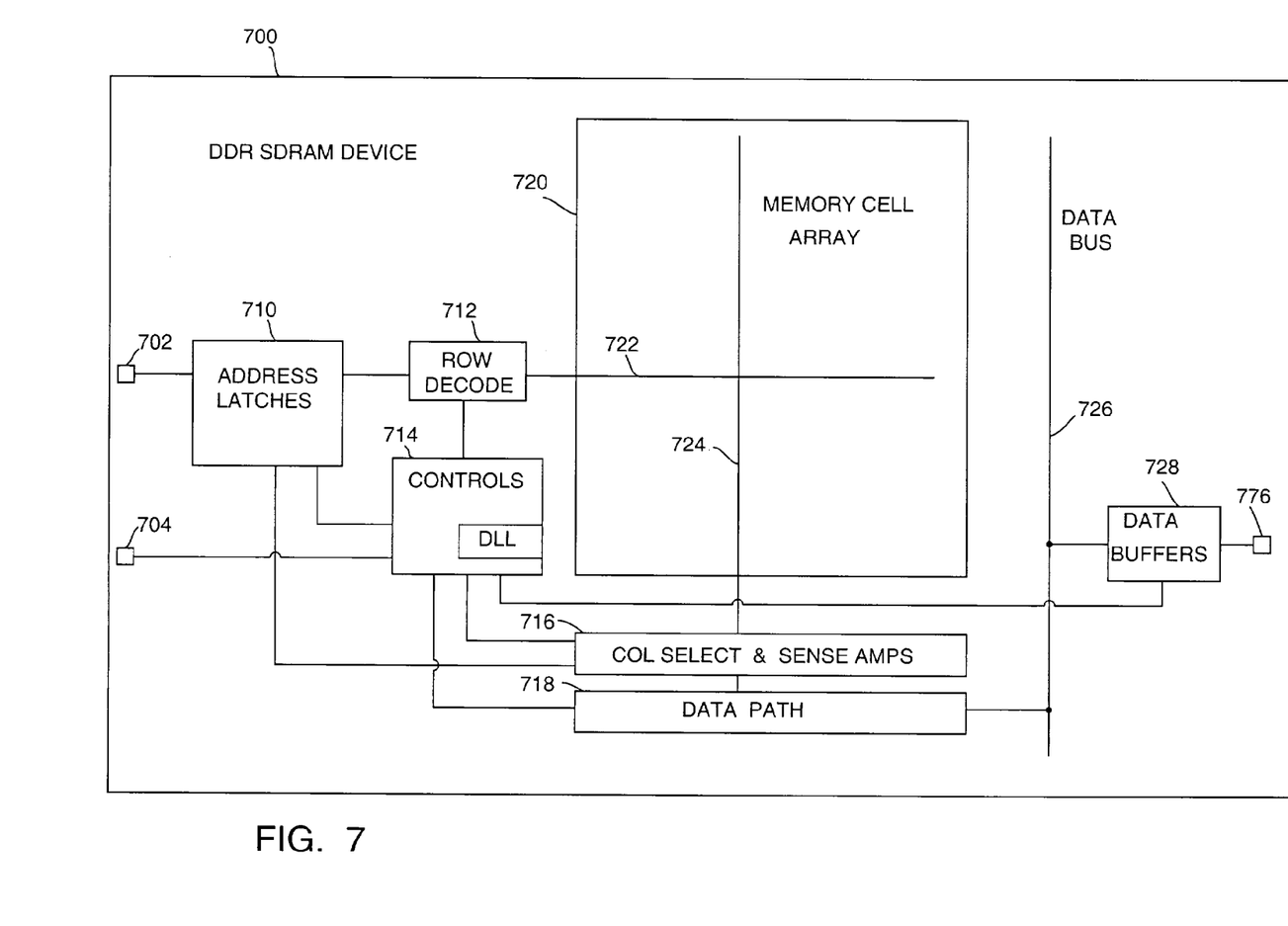
FIG. 7 shows a DDR SDRAM device.

A DDR SDRAM device 700 as shown in FIG. 7 comprises at least one array of memory cells 720 for retaining data, with support circuitry for reading, writing, and testing. DDR SDRAM device 700 has a write cycle for writing data from data ports 776 to memory array 720, and a read cycle for reading data from the array to the data ports. Address latches 710 receive signals from address ports 702, comprising row address, column address, and command data.

Address latch signals couple to row decoders 712, column select 716, and controls 714, respectively. Controls 714 obtain a reference clock and control signals such as chip-select, read/write, and test from external ports 704, and commands from the address latches to operate row decoders 712, column select/sense amp 716, and data path circuits 718. Controls 714 typically contain a DLL to set the timing of local clock signals on the device. Row decoders 712 select a row 722 of memory cells for access, responsive to the row address and section signals from the controls. Column-select and sense amplifier 716 selects bitlines 724 for access, and performs read/write operations via the selected bitlines. Data buffers 728 receive write data signals from data ports 776, and convey the write data to the memory array via a data bus 726, data path logic 718, column-select/sense amp 716, and bitlines 724. Bitlines 724 convey read data signals from the memory array to column-select/sense amp block 716, and thence to data path logic 718, the data bus 726, data buffers 728, and data ports 776.

The current invention overcomes the disadvantages of prior art circuits by providing a hierarchy of adjustable, all-digital delay lines having unique controls. Control of delay lines is performed by counter controls, counter, and decoders disposed for each delay line. The counter controls may comprise a phase detector or wrap-control as described. This topology and the design elements that render it stable and small are unique aspects of the current invention providing a novel improvement to speed, size, and stability in delay locked loop design.

Though the above description discloses many details, these details should not be understood to limit the current invention. Obvious changes, such as implementing the tap gates and output gate of each delay line using NOR gates instead of NAND gates, or switching the coarse/fine order of adjustable delay lines, while retaining the structure, function, and/or methods of the current invention, would fall within the scope of the patent rights claimed by the inventor. Therefore the scope of the current invention should be limited only by the appended claims and their legal equivalents.

The invention claimed is:

1. A circuit for generating a local clock signal synchronized to an externally generated reference clock signal, comprising:
   an input node for receiving the reference clock signal,
   an output node for conveying the local clock signal,
   a plurality of delay lines in series, forming a signal path for conveying a clock signal from the input node to the output node, each of the delay lines having means including a plurality of delay elements coupled in series, a counter, a count bus, and a plurality of decoders, one of the decoders being disposed with each one of the delay elements, for delaying the clock signal by an individually adjustable line-delay, and
   at least one of the delay lines has a phase detector for adjusting its line-delay, and
   at least one of the delay lines is a wrap controller delay line, the wrap controller delay line being directly followed in the signal path by a wrap follower delay line,
   the wrap follower delay line having means including a phase detector for adjusting the counter of the wrap follower delay line when the counter of the wrap follower delay line is not at an end of counting range,
   the wrap controller delay line having means including a wrap control for adjusting the counter of the wrap controller delay line and the counter of the wrap follower delay line such that when the counter of the wrap follower delay line is substantially at a minimum end of count range, the wrap control decreases the line-delay of the wrap controller delay line and increases the line-delay of the wrap follower delay line, such that a sum of the line-delays of the wrap controller delay line and the wrap follower delay line is substantially unchanged, and when the counter of the wrap follower delay line is substantially at a maximum end of count range, the wrap control increases the line-delay of the wrap controller delay line and decreases the line-delay of the wrap follower delay line such that the sum of the line-delays of the wrap controller delay line and the wrap follower delay line is substantially unchanged.

2. A circuit for generating a local clock signal synchronized to an externally generated reference clock signal, comprising:
   an input node for receiving the reference clock signal,
   an output node for conveying the local clock signal,
   a plurality of delay lines coupled in series, forming a signal path from the input node to the output node,
   each of the delay lines having a plurality of delay elements coupled in series, a counter, a count bus, and a plurality of decoders, one of the decoders being disposed with each one of the delay elements,
   each of the delay elements having a clock input node, an enable input node, a clock output node, and an element delay which is substantially equal for all the delay elements within each one of the delay lines,
   within each of the delay lines, each delay element in the delay line except the first delay element having a preceding delay element in the delay line, the clock input node of each of the delay elements except the first delay element being coupled to the clock output node of the preceding delay element in the delay line, the enable input node of the first delay element of the delay line being coupled logically enabled, the enable input node of each and every delay element except the first delay element of the delay line being coupled to an output node of the decoder disposed with the preceding delay element in the delay line.

3. A double data rate dynamic random access memory device comprising the circuit of claim 2.

4. A double data rate dynamic random access memory device comprising the circuit of claim 1.

5. The circuit of claim 2 wherein the number of said delay lines is two.

6. The circuit of claim 2 wherein the number of said delay lines is three.

7. The circuit of claim 2 wherein at least one of the delay lines has means including a phase detector, for comparing the phase of a replica clock with the phase of the externally generated reference clock, the phase of the replica clock differing from the phase of the local clock by a fixed amount, and for generating a signal for increasing the line-delay of the delay line of the phase detector when the phase of the replica clock leads the phase of the reference clock by more than one element-delay of the delay elements in the delay line of the phase detector, and for generating a signal for decreasing the line-delay of the delay line of the phase detector when the phase of the replica clock follows the phase of the reference clock by more than one element-delay time of the delay elements in the delay line of the phase detector.

8. The circuit of claim 2, wherein
the delay elements in each successive delay line through which the clock signal passes have smaller element-delay times, and
the count in the counter of each of the delay lines has a maximum value and a minimum value, and
at least one of the delay lines has a next following delay line, and has means including a wrap control for generating a signal for decreasing the line-delay of the delay line having the wrap control when the count in the counter of the next following delay line equals its maximum value, and for generating a signal for increasing the line-delay of the delay line having the wrap control when the count in the counter of the next following delay line equals its minimum value.

9. A method for generating a replica clock signal synchronized with an externally generated reference clock signal having a plurality of rising transitions, a plurality of falling transitions, and a substantially constant cycle time, and for generating a local clock signal having a phase differing from a phase of the replica clock signal by a fixed amount, comprising the steps of:

(a) routing the reference clock signal through a first delay line, producing a first delayed clock signal, the first delay line delaying the reference clock signal by a first line-delay, the first line-delay being adjustable by substantially equal delay increments and decrements of a first delay amount, controlled by a counter of the first delay line;

(b) routing the first delayed clock signal through a second delay line, producing the local clock signal, the second delay line delaying the first delayed clock signal by a second line-delay, the second line-delay being adjustable by substantially equal delay increments and decrements of a second delay amount, controlled by a counter of the second delay line, the second delay amount being less than the first delay amount;

(c) routing the local clock signal through a fixed delay, producing the replica clock signal, the fixed delay delaying the local clock signal by a fixed amount of time, (d) after each of the rising transitions of the reference clock signal, comparing the phase of the replica clock signal with the phase of the reference clock signal, (e) adjusting the first delay line to increase the first line-delay by the first delay amount, and adjusting the second delay line to decrease the second line-delay by approximately the first delay amount, when the counter of the second delay line is at a maximum end of range, (f) adjusting the first delay line to decrease the first line-delay by the first delay amount, and adjusting the second delay line to increase the second line-delay by approximately the first delay amount, when the counter of the second delay line is at a minimum end of range, (g) adjusting the second delay line to increase the second line-delay by the second delay amount when the phase of the replica clock signal leads the phase of the reference clock by more than the second delay amount and the counter of the second delay line is not at the maximum end of the range, (h) adjusting the second delay line to decrease the second line-delay by the second delay amount when the phase of the replica clock signal follows the phase of the reference clock by more than the second delay amount and the counter of the second delay line is not at the minimum end of the range, (i) after an adjustment of the second delay line, waiting until the first rising transition of the local clock signal propagates through the buffer delay model, and (j) repeatedly performing steps (d) through (i) above in the same sequence.

10. A method for generating a replica clock signal synchronized with an externally generated reference clock signal having a plurality of rising transitions, a plurality of falling transitions, and a substantially constant cycle time, and for generating a local clock signal having a phase differing from a phase of the replica clock signal by a fixed amount, comprising the steps of:

(a) routing the reference clock signal through a first delay line, producing a first delayed clock signal, the first delay line delaying the reference clock signal by a first line-delay, the first line-delay being adjustable by substantially equal delay increments and decrements of a first delay amount, controlled by a counter of the first delay line;

(b) routing the first delayed clock signal through a second delay line, producing a second delayed clock signal, the second delay line delaying the first delayed clock signal by a second line-delay, the second line-delay being adjustable by substantially equal delay increments and decrements of a second delay amount, controlled by a counter of the second delay line, the second delay amount being less than the first delay amount, (c) routing the second delayed clock signal through a third delay line, producing the local clock signal, the third delay line delaying the second delayed clock signal by a third line-delay, the delay of the third delay line being adjustable by substantially equal delay increments and decrements of a third delay amount, controlled by a counter of the third delay line, the third delay amount being less than the second delay amount, (d) routing the local clock signal through a fixed delay, producing the replica clock signal, the fixed delay delaying the local clock signal by a fixed amount of time, (e) upon a startup condition, initializing the counter of the second delay line to a midrange value, setting the counter of the first delay line to its minimum value, and changing the counter of the first delay line to an up counter, (f) upon a reset condition, initializing the counter of the second delay line to a midrange value, setting the counter of the first delay line to its minimum value, and changing the counter of the first delay line to the up counter, (g) upon the counter of the first delay line being at a minimum end of count range, changing the counter of the first delay line to the up counter, (h) upon the counter of the first delay line being at a maximum end of count range, changing the counter of the first delay line to a down counter, (i) after each of the falling transitions of the reference clock signal, comparing the phase of the replica clock signal with the phase of the reference clock signal, (j) adjusting the counter of the first delay line to increase the first line-delay by the first delay amount when the counter of the first delay line is the up counter and the phase of the replica clock signal differs from the phase of the reference clock signal by more than the first delay amount, (k) adjusting the counter of the first delay line to decrease the first line-delay by the first delay amount when the counter of the first delay line is the down counter and the phase of the replica clock signal differs from the chase of the reference clock signal by more than the first delay amount, (l) upon the adjustment of the first delay line, initializing the counter of the second delay line to a midrange value, (m) adjusting the second delay line to increase the second line-delay by the second delay amount, and adjusting the third delay line to decrease the third line-delay by approximately the second delay amount, when the phase of the replica clock signal leads the phase of the reference clock signal by more than the third delay amount and the counter of the third delay line is at a maximum end of range, (n) adjusting the second delay line to decrease the second line-delay time by the second delay amount, and adjusting the third delay line to increase the third line-delay by approximately the second delay amount, when the phase of the replica clock signal follows the phase of the reference clock signal by more than the third delay amount and the counter of the third delay line is at a minimum end of range, (o) adjusting the third delay line to increase the third line-delay by the third delay amount when the phase of the replica clock signal leads the phase of the reference clock by more than the third delay amount and the counter of the third delay line is not at the maximum end of range, (p) adjusting the third delay line to decrease the third line-delay by the third delay amount when the phase of the replica clock signal follows the phase of the reference clock signal by more than the third delay amount and the counter of the third delay line is not at the minimum end of range, (q) after an adjustment of the third delay line, waiting until the first falling transition of the local clock signal propagates through the buffer delay model, (r) after an adjustment of the first delay line, waiting until the first falling transition of the first delayed clock signal propagates through the second delay line, the third delay line, and the buffer delay model, and (s) repeatedly performing steps (g) through (r) above in the same sequence.

11. A method for generating a replica clock signal synchronized with an externally generated reference clock signal having a plurality of rising transitions, a plurality of falling transitions, and a substantially constant cycle time, and for generating a local clock signal having a phase differing from a phase of the replica clock signal by a fixed amount, comprising the steps of:

(a) routing the reference clock signal through a first delay line, producing a first delayed clock signal, the first delay line delaying the reference clock signal by a first line-delay, the first line-delay being adjustable by substantially equal delay increments and decrements of a first delay amount, controlled by a counter of the first delay line;

(b) routing the first delayed internal clock signal through a second delay line, producing a second delayed clock signal, the second delay line delaying the first delayed clock by a second line-delay, the second line-delay being adjustable by substantially equal delay increments and decrements of a second delay amount, controlled by a counter of the second delay line, the second delay amount being less than the first delay amount, (c) routing the second delayed clock signal through a third delay line, producing the local clock signal, the third delay line delaying the second delayed clock signal by a third line-delay, the delay of the third delay line being adjustable by substantially equal delay increments and decrements of a third delay amount, controlled by a counter of the third delay line, the third delay amount being less than the second delay amount, (d) routing the local clock signal through a fixed delay, producing the replica clock signal, the fixed delay delaying the local clock signal by a fixed amount of time, (e) upon a startup condition, initializing the counter of the second delay line to a midrange value, initializing the counter of the third delay line to a midrange value, setting the counter of the first delay line to its minimum value, and setting a count direction of the first delay line counter to count in an up direction.

(f) upon a reset condition, initializing the counter of the second delay line to a midrange value, initializing the counter of the third delay line to a midrange value, setting the counter of the first delay line to its minimum value, and setting the count direction of the first delay line counter to count in the up direction, (g) upon the counter of the first delay line being at end of count range, reversing the count direction of the first delay line counter of the first delay line, (h) after each of the rising transitions of the reference clock signal, comparing the phase of the replica clock signal with the phase of the reference clock signal, (i) adjusting the counter of the first delay line to increase the first line-delay by the first delay amount when the counter of the first delay line is counting in the up direction and the phase of the replica clock signal differs from the phase of the reference clock signal by more than the first delay amount, (j) adjusting the counter of the first delay line to decrease the first line-delay by the first delay amount when the counter of the first delay line is counting in the down direction and the phase of the replica clock signal differs from the phase of the reference clock signal by more than the first delay amount, (k) upon an adjustment of the first delay line, initializing the counter of the second delay line to a midrange value, and initializing the counter of the third delay line to a midrange value, (l) adjusting the second delay line to increase the second line-delay by the second delay amount, and adjusting the third delay line to decrease the third line-delay by approximately the second delay amount, when the phase of the replica clock signal leads the phase of the reference clock signal by more than the third delay amount and the counter of the third delay line is at a maximum end of range, (m) adjusting the second delay line to decrease the second line-delay by the second delay amount, and adjusting the third delay line to increase the third line-delay by approximately the second delay amount, when the phase of the replica clock signal follows the phase of the reference clock signal by more than the third delay amount and the counter of the third delay line is at a minimum end of range, (n) adjusting the third delay line to increase the third line-delay by the third delay amount when the phase of the replica clock signal leads the phase of the reference clock signal by more than the third delay amount and the counter of the third delay line is not at the maximum end of range, (o) adjusting the third delay line to decrease the third line-delay by the third delay amount when the phase of the replica clock signal follows the phase of the reference clock signal by more than the third delay amount and the counter of the third delay line is not at the minimum end of range, (p) after an adjustment of the third delay line, waiting until the first rising transition of the local clock signal propagates through the buffer delay model, (q) after an adjustment of the first delay line, waiting until the first rising transition of the first delayed clock signal propagates through the second delay line, the third delay line, and the buffer delay model, and (r) repeatedly performing steps (g) through (q) above in the same sequence.

12. A circuit for generating a local clock signal synchronized to an externally generated reference clock signal, comprising:

an input node for receiving the reference clock signal, an output node for conveying the local clock signal, a delay line, forming a signal path between the input node and the output node, the delay line having a plurality of delay elements, a counter, a count bus, and a plurality of decoders, one of the decoders being disposed with each one of the delay elements, each of the delay elements having a clock input node, an enable input node, and a clock output node, and an element delay which is substantially equal for all the delay elements of the delay line, each delay element in the delay line except the first delay element having a preceding delay element in the delay line, the clock input node of the first delay element of the delay line being coupled to the reference clock signal, the clock input node of each of the delay elements except the first delay element being coupled to the clock output node of the preceding delay element in the delay line, the enable input node of the first delay element of the delay line being coupled logically enabled, the enable input node of each and every delay element except the first delay element of the delay line being coupled to an output node of the decoder disposed with the preceding delay element in the delay line.

13. A circuit for generating a local clock signal synchronized to an externally generated reference clock signal, comprising:

an input node for receiving the reference clock signal, an output node for conveying the local clock signal, and at least one delay line comprising a plurality of delay elements, each delay element having an input node for receiving a clock signal and an output node for conveying a delayed copy of the clock signal, the delay elements being coupled in series, the input node of each of the delay elements except the first delay element being coupled to the output node of the preceding delay element in the delay line, the delay line having means including a phase detector, a counter, a count bus, and a decoder disposed with each of the delay elements, for controlling a line-delay of the delay line, the phase detector having a first input node for receiving a reference clock signal and a second input node for receiving a replica clock signal, the phase detector having means including a delay element, for disabling comparison of the reference clock signal to the replica clock signal after each adjustment of the line delay, until the newly adjusted replica signal becomes valid.

* * * * *